US006194716B1

(12) United States Patent
Takada et al.

(10) Patent No.: US 6,194,716 B1
(45) Date of Patent: Feb. 27, 2001

(54) METHOD FOR MASS CALIBRATION

(75) Inventors: Yasuaki Takada, Kodaira; Takayuki Nabeshima, Kokubunji; Minoru Sakairi, Tokorozawa; Yuichiro Hashimoto, Kokubunji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/143,399

(22) Filed: Aug. 28, 1998

(30) Foreign Application Priority Data

Sep. 1, 1997 (JP) .................................................. 9-235781

(51) Int. Cl.[7] .................................................. B01D 59/44

(52) U.S. Cl. ........................ 250/292; 250/282; 250/252.1

(58) Field of Search .................................... 250/292, 282, 250/252.1

(56) References Cited

U.S. PATENT DOCUMENTS 5,179,278 * 1/1993 Douglas .............................. 250/292
5,397,894 * 3/1995 Wells et al. .......................... 250/292
5,479,012 * 12/1995 Wells .................................. 250/292
5,696,376 * 12/1997 Doroshenko et al. ............... 250/292

* cited by examiner

*Primary Examiner*—Kiet T. Nguyen
(74) *Attorney, Agent, or Firm*—Antonelli, Terry, Stout & Kraus, LLP

(57) ABSTRACT

A method for performing a mass calibration under an application of a desired ion peak position of mass spectrum attained by a mass scanning of ions of substance having a known value of m/z and the known value of m/z is added with a step for ejecting an amount of unnecessary ions not contributing to the aforesaid mass calibration accumulated in the aforesaid ion trap type mass analysis region prior to the aforesaid mass scanning operation. An accumulation of a large amount of unnecessary ions in the ion trap type mass analysis region is restricted, a disturbance of electric field in the ion trap mass analysis region generated under an influence of a spatial charge caused by accumulation of the unnecessary ions can be prevented and the aforesaid mass calibration can be performed in an easy and accurate manner.

9 Claims, 12 Drawing Sheets

METHOD FOR MASS CALIBRATION

BACKGROUND OF THE INVENTION

1. Field of the Invention

This invention relates to a method for mass calibration, and more particularly a method for mass calibration in a mass spectrometer having an ion trap type mass analysis region.

2. Description of Related Arts

At present, it has been required to establish a technology for performing an analysis of mixture in the field of the analysis technology. For example, in the case that some harmful substances in environment are analyzed, various kinds of substances are contained in the collected samples (for example, water of lake or pond). In addition, a similar state occurs also in the field of analysis of biological compound. It is known that some various kinds of substances are contained in the samples based on the biological compounds such as blood or urine. As described above, in the case that the environmental compounds or biological compounds are analyzed, it is required to provide a technology in which mixtures are processed and analyzed.

Since it is generally difficult to perform a direct analysis of the mixture, each of the components is detected and identified after the desired components in the mixture are separated. In such a circumstance as described above, a liquid chromatograph/mass spectrometer (hereinafter abbreviated as an LC/MS) in which a liquid chromatograph showing a superior separation of mixture and a mass spectrometer showing a superior identification for substances are coupled to each other is quite effective for analyzing some compounds containing several kinds of compounds such as the aforesaid environmental compounds or biological compounds to be analyzed.

Referring now to FIG. 1, the prior art LC/MS using the mass spectrometer having an ion trap type mass analysis region will be described.

A liquid chromatograph 1 is comprised of a liquid chromatograph pump 2, a mobile phase reservoir 3, a sample injector 4, a separation column 5 and a tube 6. The mobile phase solvent in the mobile phase reservoir 3 is fed in its specified flow rate to the separation column 5 by the liquid chromatograph pump 2. Sample of mixture is fed into the mobile phase solvent by the sample injector 4 arranged between the liquid chromatograph pump 2 and the separation column 5. The sample of mixture reached to the separation column 5 is separated for every components under interaction with the packing material filled in the separation column 5. The separated sample substances are fed into an ion source 7 together with the mobile phase solvent.

Although there are several kinds of ion sources to be applicable, the case in which the ion source 7 operated under an electrospray will be described as one typical example of it. The sample component reached to the ion source 7 is fed into a metal tube 9 through a connector 8. As a high voltage of several kilo-volts is applied between the metal tube 9 and an electrode 10 arranged in opposition to the terminal end of the metal tube 9 by a high voltage power supply 11, electrospray may be produced from the terminal end of the metal tube 9 toward the opposing electrode 10. In this case, although a flow rate of solution capable of keeping a stable electrospray is several micro-litters per minute, a flow rate of solution fed from the liquid chromatograph 1 to the ion source 7 is normally 1 milli-litter per minute. In view of this fact, nebulization gas 13 supplied from a gas supplying tube 12 is flowed along the outer circumference of the metal tube 9 and then the aforesaid electrospray is assisted by the high speed gas flow. Since some ions related to the components in the sample are contained in liquid droplets generated by the electrospray, the liquid droplets are dried to enable ions of gaseous sample component to be attained.

The ions produced in this way are fed through an ion introduction aperture 14*a* arranged in the opposing electrode 10 into a differential pumping region 16 evacuated by a vacuum pumping system 15*a,* and further fed through an ion introduction aperture 14*b* into a vacuum region 17 evacuated by a vacuum pumping system 15*b*. Ions fed into the vacuum region 17 are focused by an ion focusing lens 18 composed of electrodes 18*a,* 18*b* and 18*c,* thereafter the ions are fed into the ion trap type mass analysis region 20. In addition, the gate electrode 21 is arranged in order to control injection of ions into the ion trap type mass analysis region 20.

The ion trap type mass analysis region 20 is comprised of endcap electrodes 19*a,* 19*b* and a ring electrode 19*c*. In FIG. 2 are indicated an amplitude of a high frequency voltage applied to the ring electrode 19*c* and a change in time of a control voltage applied to the gate electrode 21 only for a time in which a mass spectrum is taken once (a relation in variation of time in respect to a voltage applied to each of the electrodes shown in FIG. 2 is hereinafter called as a scan function).

As shown in FIG. 2, at first, a high frequency voltage is applied to the ring electrode 19*c* within an ion accumulating period 101 and then a potential for use in trapping the ions is formed within a space enclosed by the endcap electrodes 19*a,* 19*b* and the ring electrode 19*c* (hereinafter called as an ion trap space). In this case, when positive ions are analyzed, a control voltage applied to the gate electrode 21 is decreased (on) in order to enable the positive ions to pass through the gate electrode 21. Ions introduced into the vacuum region 17 are focused by the focusing lens 18, pass through the opening of the endcap electrode 19*a* and then incident into the aforesaid ion trap space.

Collision gas such as helium gas or the like is fed into the aforesaid ion trap space and it is kept at a pressure of about 1 mTorr or the like, so that ions injected into the aforesaid ion trap space strike against molecules of the aforesaid collision gas to lose their energy, wherein the ions are trapped into the ion trap space by the ion trap potential formed in the aforesaid ion trap space.

Then, an amplitude of the high frequency voltage applied to the ring electrode 19*c* in the scan period 102 is increased in sequence to perform a mass scanning. In this case, the control voltage applied to the gate electrode 21 is increased (off) to prevent the ions from passing through the gate electrode 21. As an amplitude of the high frequency voltage applied to the ring electrode 19*c* is gradually increased, an orbit of ions having a lower value (m/z) in which a mass (m) of ions is divided by an electrical charge (z) of ions becomes unstable and then the ions are discharged out of the mass analysis region 20 through the opening of the endcap electrode 19*b*. The discharged ions are detected by an ion sensor 22, its detected signal is sent to a data processing unit 24 through a signal line 23 and processed there.

Upon completion of the scan period 102, the high frequency voltage applied to the ring electrode 19*c* is turned off to diminish an ion trapping potential and further remove ions remained in the mass analysis region 20 (the residual ion eliminating period 103). Such a series of operations (ion accumulation 101, scanning 102 and residual ion eliminating 103) are performed in a repetitive manner, resulting in that the mass of samples fed in sequence from the liquid chromatograph 1 can be analyzed.

In addition, although not illustrated in FIG. 1, the liquid chromatograph 1, the ion source 7 and the ion trap mass analysis region 20 are controlled by a control system (including a power supply for controlling operation, a control circuit or a control software or the like /not shown).

The mass spectrometer having the aforesaid electrospray region and the ion trap type mass analysis region is already disclosed in Analytical Chemistry, 1991, Volume No. 63 and page 375, for example. In addition, a principle in operation of the ion trap type mass analysis region is already disclosed in the official gazette of U.S. Pat. No. 4,540,884 or the like.

In the case that a mass spectrum is attained under application of the mass spectrometer, a value m/z of the sample ion appeared on the spectrum (m is a molecular weight of ion and z is a charge number of ion) must be determined accurately. Due to this fact, the present mass spectrometer has a scale (an index) called as a mass marker and the value of m/z of ion is calculated by reading this mass marker. However, since this mass marker does not always display an accurate value, it must be confirmed sometimes whether or not the mass marker is correct. In the case that the mass marker is not correct, it is necessary to correct the mass marker (a so-called mass calibration).

The correction of the mass marker is carried out such that a peak position of ion intensity of substance (a standard sample) having a known value of m/z of ion to be generated is measured and its adjustment is performed so as to cause the ion to be detected at a position of a predetermined m/z value. As the standard sample, polyethylene glycol having a molecular structure of $HO—(CH_2—CH_2—O)_n—H$ (n is an optional positive integer) is generally applied.

As polyethylene glycol is ionized under application of electrospray, peaks of protonated quasi-molecular ions are strongly observed. FIG. 3 shows a mass spectrum in the case that two kinds of commercial available polyethylene glycol having an average molecular weight of each of 200 and 600 are mixed to each other and applied as a standard sample, respectively. As apparent from FIG. 3, under application of polyethylene glycol causes a plurality of peak values to be observed at positions spaced apart by about 44 of molecular weights. Accordingly, under an application of the mixed polyethylene glycol as standard samples as described above, it is possible to correct the mass marker over a wide range.

In addition, in the official gazette of Japanese Patent Laid-Open No. Hei 3-116646 is disclosed a method for correcting the mass marker with water cluster ions being applied as a standard sample.

However, in accordance with the study performed by the present inventors and the like, it has become apparent that the following problems may occur if the aforesaid polyethylene glycol is used as the standard sample in the mass spectrometer having the ion trap type mass analysis region. That is, since the number of ions which can be accumulated at the ion trap type mass analysis region is less, accumulation of ions exceeding limit causes an electric field in the mass analysis region to be strained by a Coulomb repulsion force with a large amount of spatial electric charge generated under an increased density of accumulation of a large amount of ions, and a reduction in performance such as a reduction in a mass resolution or a shift of the value of m/z (a reduction in resolution or a mass shift) to be observed. Accordingly, if a correction of mass marker is carried out with polyethylene glycol of high concentration being applied as a standard sample, many kinds of quasi-molecular ions are generated at positions spaced apart by about 44 in molecular weights, resulting in that ions exceeding limit are accumulated within the mass analysis region and a reduction in performance as described above (reduction in resolution or mass shift) is generated.

Under a state in which the resolution is decreased or the mass shift is produced, it is apparent that the mass marker can be accurately corrected. In addition, when the mass marker is corrected under application of sample having a low concentration in order to weaken the aforesaid Coulomb repulsion force, it is possible to avoid the reduction in resolution or the mass shift, although an ion intensity is weak, resulting in that the number of count at the peak position is reduced and the peak position can not be determined accurately and the accurate mass calibration is difficult.

In addition, as the standard substances, if the value of m/z of the generated ions is known, any type of substances can be applied. However, in general, one type of substance mainly generates one type of ion only, so that in the case that the mass marker is corrected in a wide range of m/z value, many kinds of samples must be prepared and the operation becomes quite troublesome.

SUMMARY OF THE INVENTION

Accordingly, it is an object of the present invention to provide a method for mass calibration in which the aforesaid prior art problems are resolved and a mass marker having a wide range of m/z value can be easily corrected in the mass spectrometer using an ion trap type mass analysis region.

The method for mass calibration of the present invention accomplishing the aforesaid object in which the mass calibration for the mass spectrometer having an ion trap type mass analysis region under application of a peak position of ion intensity obtained after mass scanning of ions of substances of which ratio (m/z value) of molecular weight (m) and the charge number (z) is known is carried out characterized in that an amount of ions accumulated at the aforesaid ion trap type mass analysis region is reduced prior to performing the aforesaid mass scanning.

That is, in the case that the mass calibration is carried out under an application of the standard sample in which the m/z value of the ions to be generated is apparent to be 152.0 in advance, if the m/z value on the mass marker 202 of the ion peak 201 of the aforesaid standard sample in its initial state as shown in FIG. 4(*a*) is observed to be 152.5, for example, this is apparently erroneous. Accordingly, in this case, as shown in FIG. 4(*b*), the mass marker 202 must be corrected in such a way that the value of m/z of the ion peak 201 may show 152.0.

In the case that the mass marker is corrected, the mass marker within a limited range is displayed on the monitor of the data processing unit and the mass marker is corrected in such a way that the peak point of the observed ion peak may be displayed at a predetermined position on the mass marker. Accordingly, the ions having the value of m/z other than the noted part (in the case of the aforesaid example, the value of m/z is within a range of 151 to 153) do not contribute to this correction. In the mass spectrometer having the ion trap type mass analysis region, an amount of ions capable of being accumulated at the mass analysis region is limited as described above, so that when the mass calibration is carried out, if the ions not contributed to such correction as above can be expelled outside the mass analysis region, it is possible to reduce a deterioration of performance caused by the spatial charge generated by the accumulated ions.

In the present invention, as shown in FIG. 5, when the mass calibration is performed, unnecessary ion ejecting period 104 for ejecting unnecessary ion is arranged between an ion accumulating period 101 and a scan period 102, the unnecessary ions are ejected in advance prior to the mass marker calibration to enable a high accurate mass marker calibration to be carried out.

In the case that the mass calibration is actually carried out, it is normally confirmed at first that a mass spectrum having a wide range of the value m/z is present. At this stage, the normal scan function shown in FIG. 2 is applied. Then, an ion peak value appeared at the position of the m/z value to be corrected on the mass calibration is displayed in its enlarged scale. In this case, as shown in FIG. 5, either a part of or all the ions having a peak other than the noted peak value in the unnecessary ion ejecting period 104 are ejected outside the mass analysis region. With such an arrangement as above, an amplitude of a high frequency voltage applied to the ring electrode 19*c* can be increased and a total amount of ions accumulated inside the mass analysis region at the starting time of the scan period 102 for performing the mass scanning operation can be reduced, so that it is possible to avoid mass shift or reduction in mass resolution caused by the aforesaid Coulomb repulsion force and to perform an accurate correction of the mass calibration.

An amount of ions within the ion trap type mass analysis region can be reduced effectively by a method wherein a noise not including a certain specific frequency component, but having another desired frequency component different from this specific frequency component is applied between a pair of endcap electrodes 19*a,* 19*b* arranged to be oppositely faced against each other at the ion trap type mass analysis region. As per such noise as described above, this is already described in the specification of U.S. Pat. No. 5,206,507 as a Filtered Noise Field, so that in the present specification, this is abbreviated as an FNF. In this FNF, one processing in which the aforesaid specific frequency component is not included and the other processing in which the aforesaid other desired frequency component is provided can be easily carried out. Accordingly, if the frequency which is the most suitable one for ejection is left in response to the type of ions to be ejected and other frequency components are not contained, the ions to be ejected can be selectively ejected and the ions required for the measurement of the value of m/z can be left in the ion trap type mass analysis region.

That is, the ions accumulated in the ion trap type mass analysis region have a specific resonance frequency corresponding to the value of m/z. Accordingly, if the high frequency voltage which is equal to the aforesaid specific resonance frequency is applied between the endcap electrodes 19*a,* 19*b,* the ions having the specific m/z value can be resonated and accelerated. The amplitude of the high frequency voltage applied between the endcap electrodes 19*a,* 19*b* is adjusted to a desired amplitude to cause the ions having the aforesaid specific m/z value to be selectively ejected. If the voltage having all the frequency components (white noise) is applied between the endcap electrodes 19*a,* 19*b,* all the ions are ejected in view of its principle.

It is possible that an amount of accumulated ions in the mass analysis region is reduced after the ions are once accumulated in the mass analysis region. A voltage applied to the gate electrode 21 arranged in the concave part of the endcap electrode 19*a* installed at the ion injection side is kept low while the aforesaid ions are being accumulated in the aforesaid mass analysis region and in turn the voltage is kept high when an amount of the accumulated ions is decreased to prevent any new ions from being inputted. At this time, a noise voltage (FNF) applied between the endcap electrodes 19*a* and 19*b* for ejecting the accumulated ions is kept OFF (a zero amplitude) during a period in which the ions are accumulated in the mass analysis region and in turn the voltage is kept ON (a predetermined amplitude) during a period in which an amount of accumulated ions is decreased.

In addition, an operation for reducing the aforesaid amount of the accumulated ions can be performed (in concurrent with) an accumulating operation of the ions into the mass analysis region. During this time, the aforesaid noise voltage (FNF) applied between the aforesaid endcap electrodes is kept ON (a predetermined amplitude) also during a time in which ions are accumulated in the mass analysis region. With such an arrangement as above, the unnecessary ions can be selectively ejected also during a period in which the desired ions are being accumulated, so that the unnecessary ion ejecting period 104 is not necessarily arranged in separate from the ion accumulating period 101.

In addition, in the present invention, the annular ring electrode 19*c* is arranged between the endcap electrodes 19*a,* 19*b* and then a high frequency voltage is applied to the aforesaid ring electrode 19*c* during a period in which the ions are accumulated in the mass analysis region and during a period in which an amount of accumulation of the ions is reduced. This is in common to both cases in which the aforesaid ion accumulating operation and the ion reducing (ejecting) operation are carried out concurrently and in which the ion reducing (ejecting) operation is carried out after the ion accumulating operation is carried out.

Further, it is possible to enlarge and display a range of a predetermined value of m/z including a peak position of ion intensity of the desired ion of substance in which the aforesaid value of m/z is known and to eject either a part of or all the ions outside the predetermined range of m/z value. For example, in the case that a m/z value required for the correction is 239.1, the range of the m/z value from 234 to 244 is enlarged and displayed and the ions outside this range are ejected. With such an arrangement as above, it is possible to prevent influence from being applied by spatial charge and to perform a mass calibration in a high accuracy.

In addition, the present invention can also be applied not only to an LC/MS, but also a mass spectrometer other than LC/MS such as a capillary electrophoresis/mass spectrometer using a capillary electrophoresis acting as a separating means, for example, or a plasma mass spectrometer in which sample molecules in the solution are ionized by plasma and the generated ions are analyzed for their mass if the mass spectrometer having an ion trap type mass analysis region is applied.

Further, in order to ionize the sample molecules in the solution, it is also possible to apply another atmospheric pressure ionization process such as an atmospheric pressure chemical ionization process utilizing a corona discharge and a sonic spray ionization process utilizing a high-speed gas flow, for example, in addition to an electrospray process utilizing an ionization phenomenon under the aforesaid electrospray.

Further, although the application of the aforesaid noise voltage (FNF) is the most useful method for ejecting the unnecessary ions in view of its practical state, it is also possible to apply a method for adjusting a direct current voltage and a high frequency voltage applied to the ring electrode 19*c,* for example, and for ejecting the unnecessary ions.

Other objects, constitutions, actions and effects attained by these constitutions of the present invention other than the foregoing will become apparent in sequence in the following detailed description of the preferred embodiments.

DETAILED DESCRIPTION OF THE PREFERRED EMBODIMENTS

Figure 1:
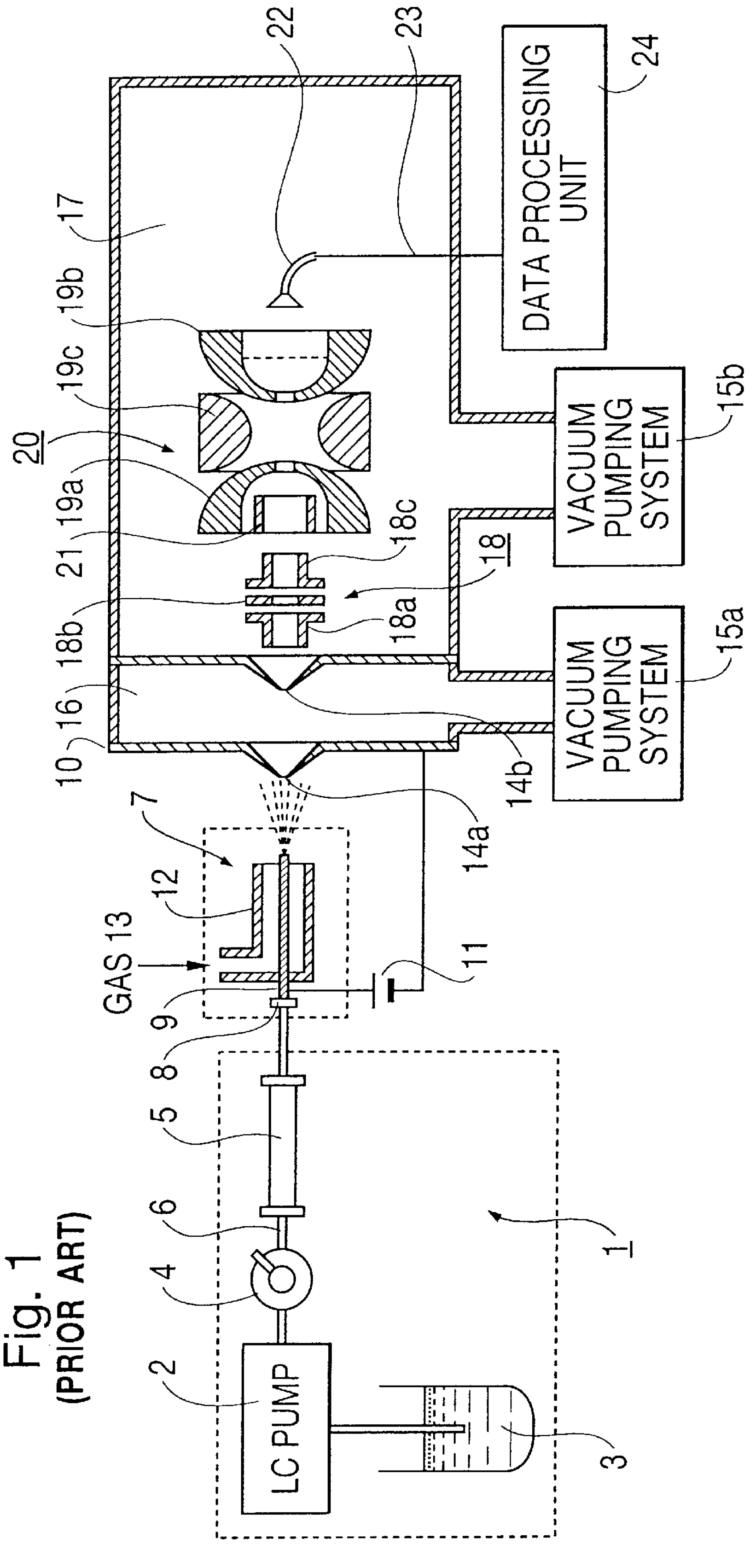
Fig. 1 (PRIOR ART)
FIG. 1 is a view for showing one example of configuration of an LC/MS having an ion trap type mass analysis region.
Figure 2:
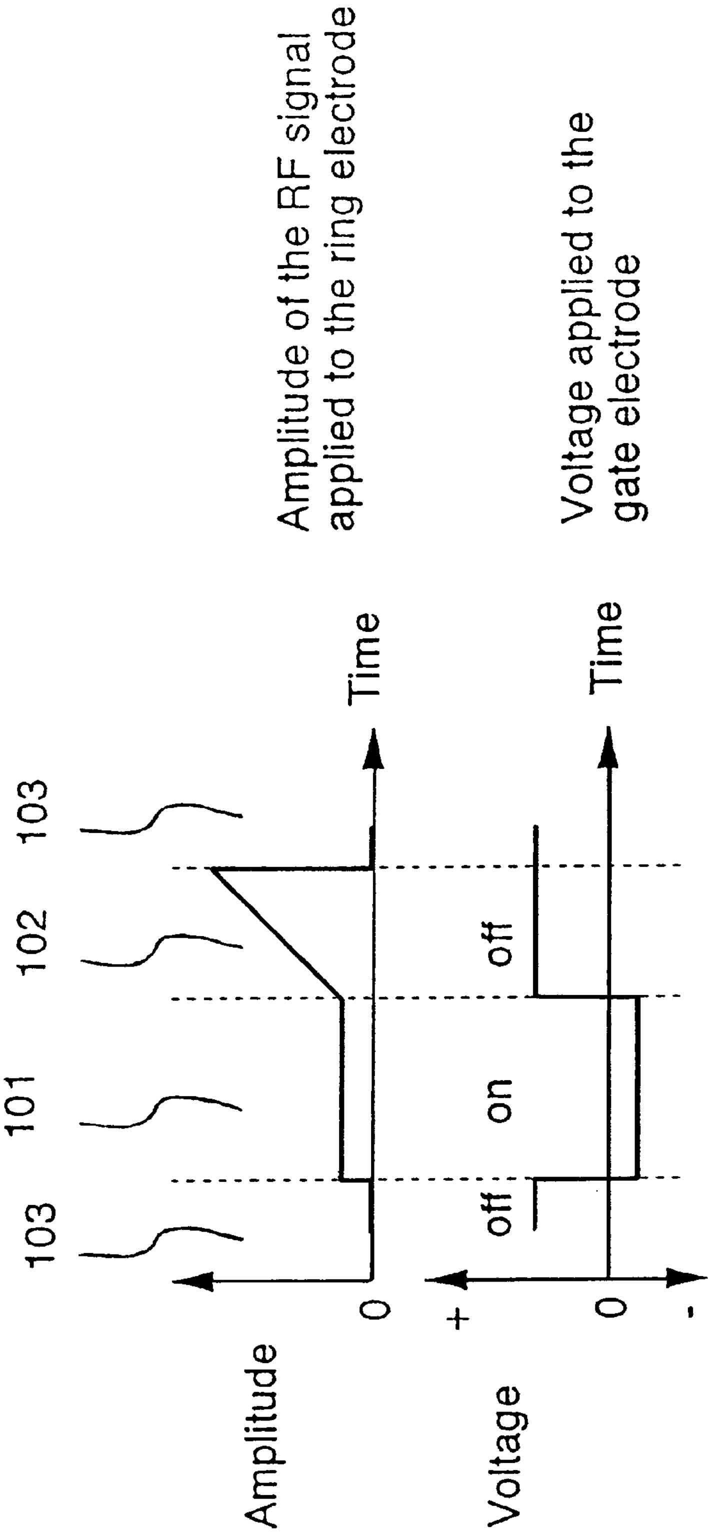
Fig. 2 (PRIOR ART)
FIG. 2 is a view for showing one example of the prior art scan function.

Referring now to the drawings, some preferred embodiments of the present invention will be described in detail.

Embodiment 1

In the present invention, although various kinds of methods for ejecting the unnecessary ions in the aforesaid unnecessary ion ejecting period can be used, the preferred embodiment 1 of the present invention is an example in which the aforesaid noise voltage (FNF) is applied for ejecting the unnecessary ions.

As described above, if a high frequency voltage of which frequency is equal to a specific resonance frequency of ions to be ejected is applied between the endcap electrodes 19*a* and 19*b,* the ions having the specific value of m/z can be resonated and accelerated. Accordingly, both a frequency and an amplitude of the FNF applied between the endcap electrodes 19*a* and 19*b* are adjusted to enable ions having the aforesaid specific m/z value to be selectively ejected.

Figure 6:
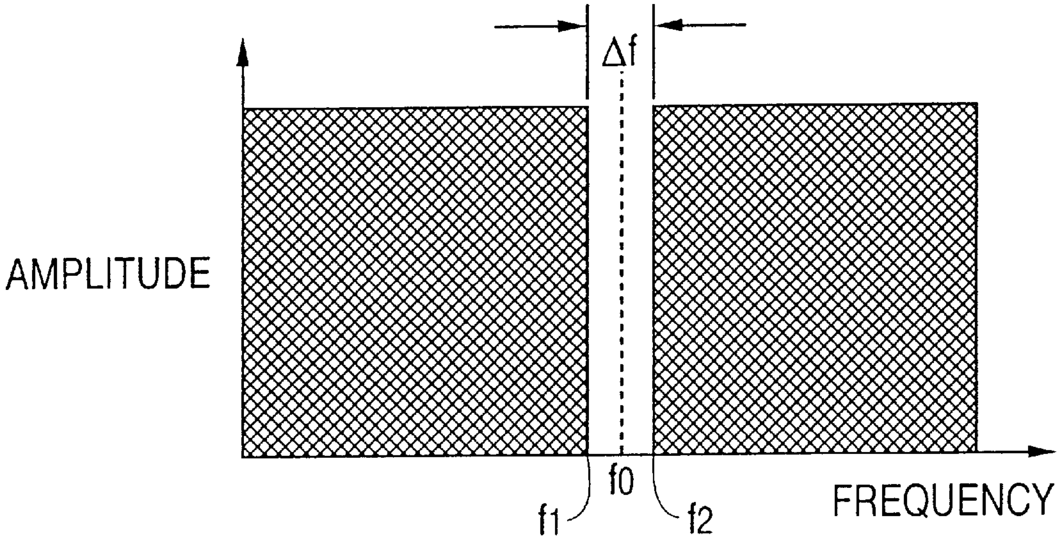
FIG. 6 is a view for illustrating a first preferred embodiment of the present invention.

In this preferred embodiment, in FIG. 6 is indicated a relation between an FNF voltage applied between the endcap electrodes 19*a,* 19*b* and a frequency when the noise voltage (FNF) is applied. If it is assumed that a specific frequency for use in accumulating (trapping) ions attained by the standard sample is defined as $f_0$, it is satisfactory to apply a high frequency voltage not including this $f_0$. However, actually collision gas such as helium gas or the like is fed into the ion trap type mass analysis region and the ions are disturbed away from a rational orbit by collision, so that it is hard to make a strict definition of the aforesaid specific frequency $f_0$. Accordingly, in the present preferred embodiment, the frequency component to be eliminated from the applied FNF voltage is set to have a value between f1 and f2 with a certain width Δf as shown in FIG. 6.

Figure 7:
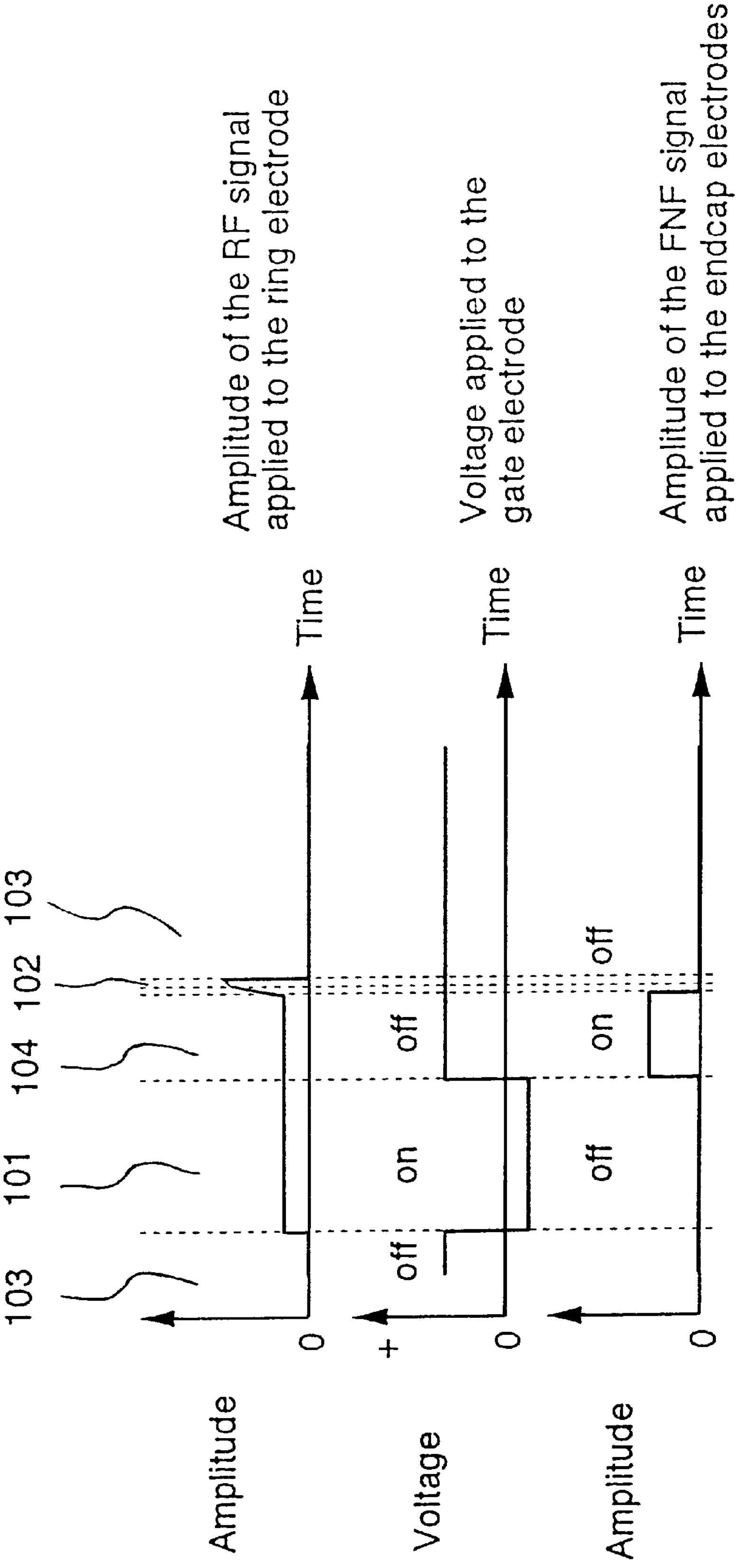
FIG. 7 is a view for illustrating a scan function in a first preferred embodiment of the present invention.

In the present preferred embodiment, in FIG. 7 is indicated a scan function when an unnecessary ion is eliminated under an application of FNF process. As apparent from FIG. 7, in the present preferred embodiment, after the ions were accumulated in the ion trap type mass analysis region in the ion accumulating period 101, the FNF voltage was applied between the endcap electrodes 19*a,* 19*b* in the unnecessary ion eliminating period 104 subsequent to this so as to eliminate the unnecessary ions.

That is, as the standard substance, $(HO—(CH_2—CH_2O)_5—H)H^+$ with a value of m/z being 239.1 was used, a voltage of the gate electrode 21 was −120 V in the ion accumulating period 101, no FNF voltage was applied between the endcap electrodes 19*a,* 19*b,* a voltage of the gate electrode 21 was increased up to +120 V in the next unnecessary ion ejecting period 104 to prevent flowing-in of the ions and at the same time the FNF voltage with an amplitude of 0.1 V was applied between the endcap electrodes 19*a,* 19*b*. In addition, at any one of the ion accumulating period 101 and the unnecessary ion ejecting period 104, a high frequency voltage of predetermined frequency for use in trapping the ions of the standard sample was applied to the ring electrode 19*c*. In addition, application of the FNF voltage was stopped (OFF) at the scan period 102.

As a result, a peak value of sufficient high ion intensity could be attained at a location where the value of m/z was 239.1 and it could be confirmed that the mass calibration can be performed in a high accuracy.

Embodiment 2

Figure 8:
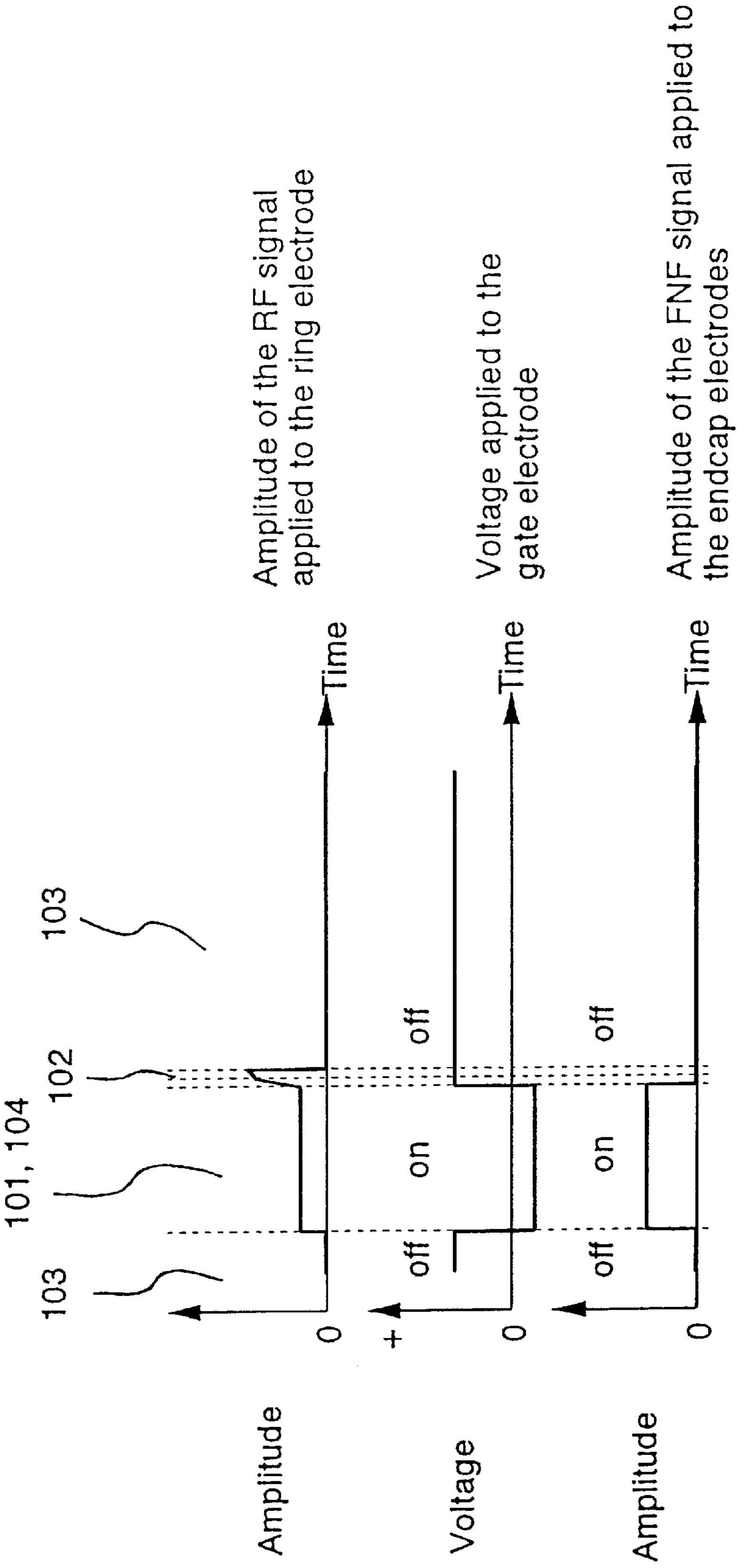
FIG. 8 is a view for illustrating a scan function in a second preferred embodiment of the present invention.

The present preferred embodiment is an example in which the in accumulating period 101 and the ion ejecting period 104 are set to the same to each other. That is, as shown in FIG. 8, in order to reduce an amount of unnecessary ions accumulated in the ion trap type mass analysis region, the FNF voltage was applied between the endcap electrodes 19*a,* 19*b* also in the ion accumulating period 101 and then both accumulation of required ions and the ejection of non-required ions were carried out concurrently. In this case, although the unnecessary ions are accumulated once in the mass analysis region, the ions were ejected gradually under an effect of application of the FNF voltage and an amount of unnecessary ions could be reduced down to a value less than a predetermined amount until the scan period 102 was started.

In the present preferred embodiment, $(HO—(CH_2CH_2O)_{11}—H)H^+$ with a value of m/z being 503.3 was used as a standard substance, the ion accumulating period 101 and the unnecessary ion ejecting period 104 were set to the same to each other, a negative voltage was applied to the gate electrode 21 to take ions and at the same time the FNF voltage was applied between the endcap electrodes 19*a,* 19*b* to eject the unnecessary ions. Applied voltage to the gate electrode was −120 V and an amplitude of the applied voltage (FNF voltage) between the endcap electrodes was 0.05 V.

As a result, similar to the aforesaid preferred embodiment 1, an ion peak value of sufficient high ion intensity could be attained at a location having a value of m/z of 503.3 and it could be confirmed that the mass calibration can be performed in a high accuracy.

Embodiment 3

The present preferred embodiment is an example in which as a standard sample for mass calibration, polyethylene glycol of high concentration was used and even if many kinds of standard samples were not prepared, the mass calibration of wide range could be performed. In addition, since the standard sample of high concentration is used, it is possible to attain a high sufficient intensity of ion peak to be noted and further influence of spatial charge as described above is reduced because the ions (unnecessary ions) not to be noted is reduced. Due to this fact, it is possible to perform a mass calibration with a wide range of m/z value in a convenient and sufficient practical accuracy.

Figure 3:
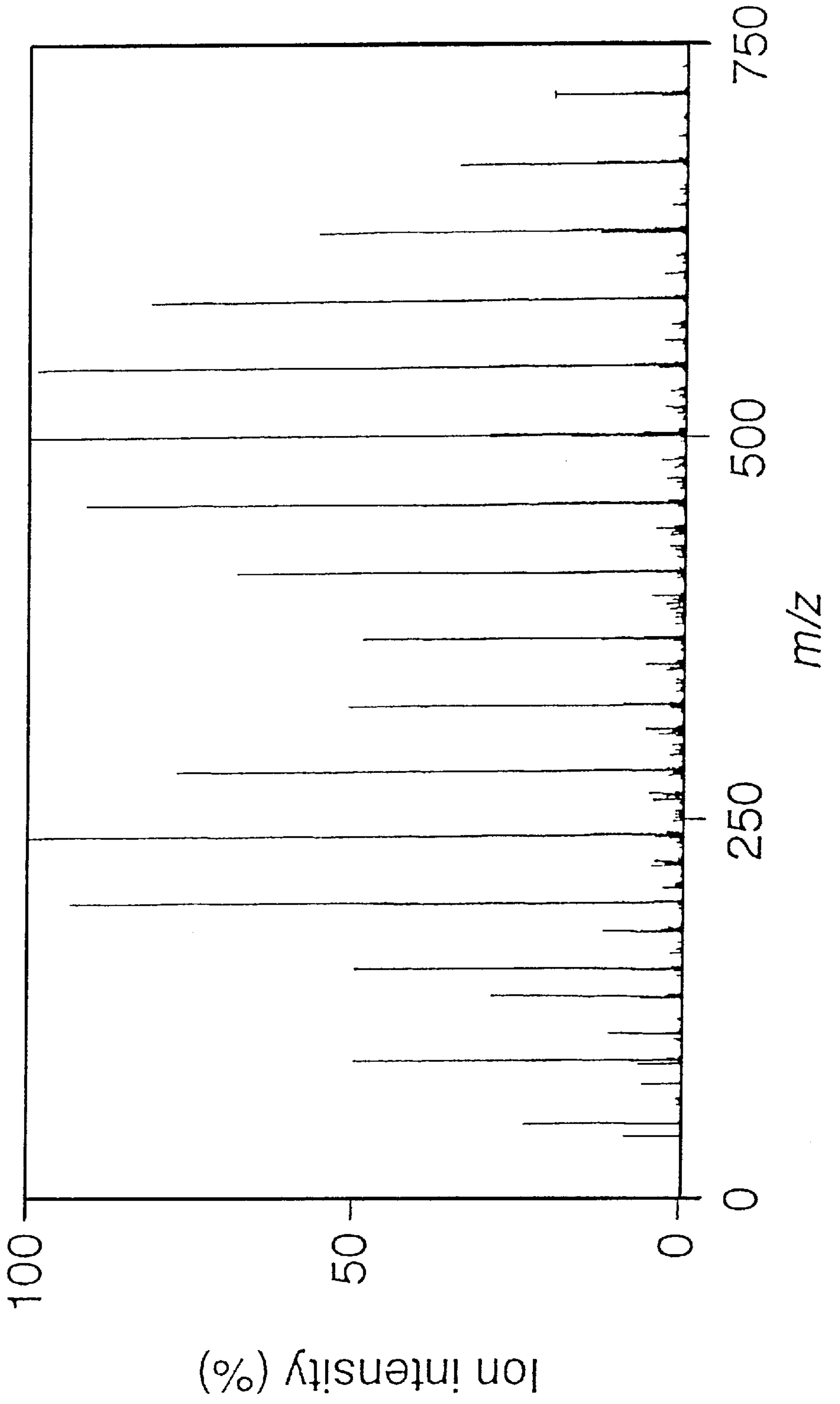
Fig. 3 (PRIOR ART)
FIG. 3 is a view for showing a typical mass spectrum of polyethylene glycol.
Figure 4:
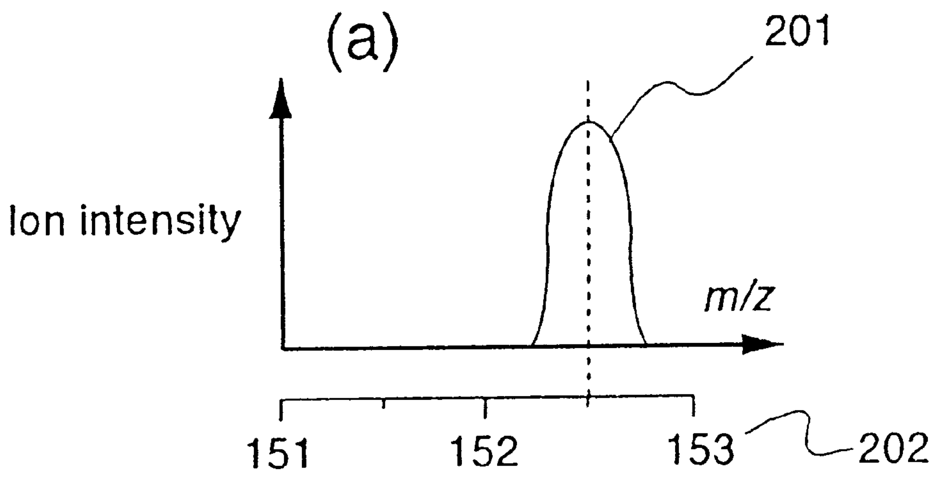
FIG. 4 is a view for showing a method for mass calibration.
Figure 4:
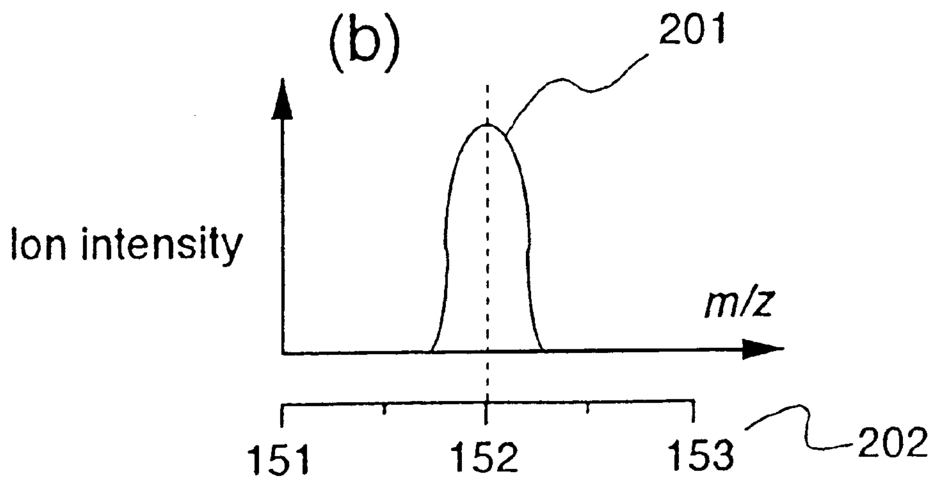

At the ion accumulating period 101 in the scan function in the present preferred embodiment, some ions are accumulated in the ion trap type mass analysis region. After this operation, when the scan (the amplitude of the high frequency voltage applied to the ring electrode 21 is gradually increased to perform a mass scanning) was carried out, many ion species were observed as shown in FIG. 3.

Figure 5:
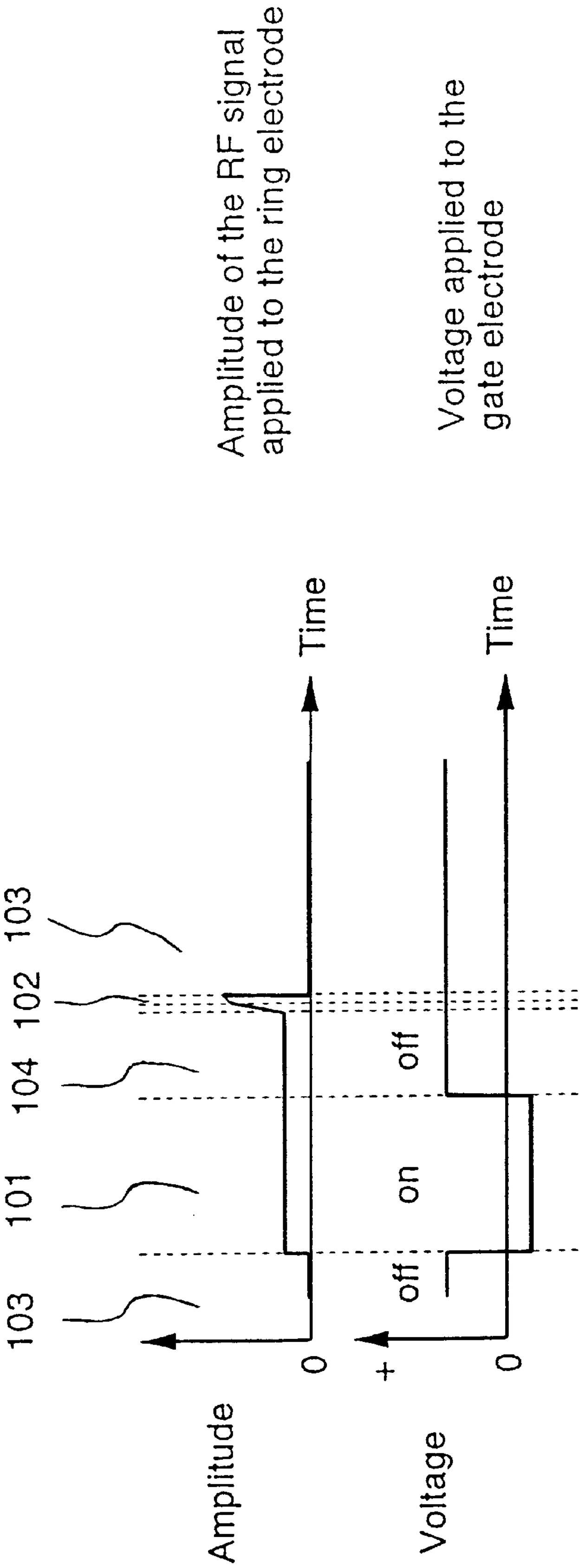
FIG. 5 is a view for showing one example of a scan function in the present invention.
Figure 9:
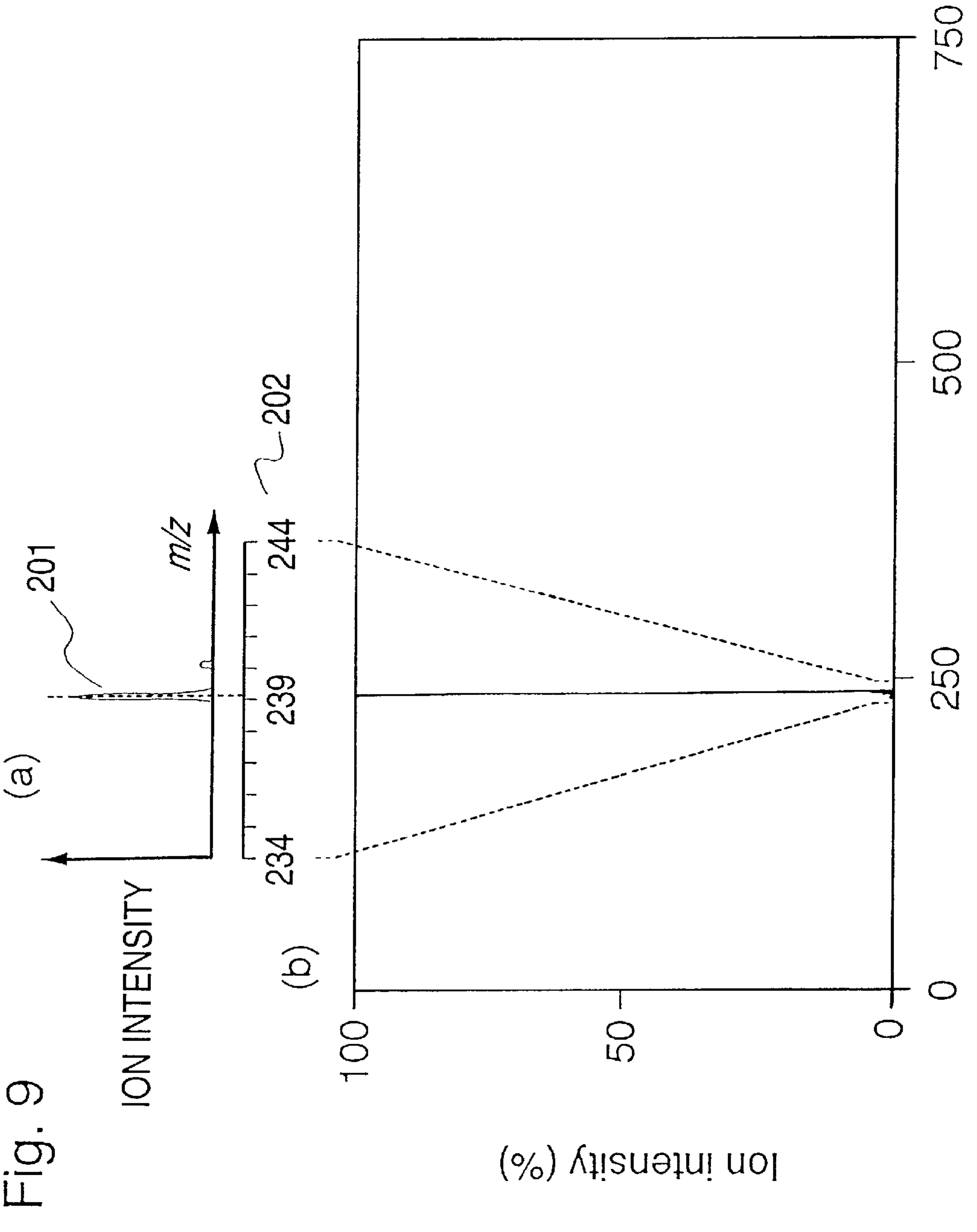
FIG. 9 is a view for illustrating a third preferred embodiment of the present invention.

In the present preferred embodiment, although the mass calibration was performed under application of ions of $(HO—(CH_2—CH_2—O)_5—H)H^+$ with m/z=239.1, in the case that a range in which a value of m/z including a mass calibration value (a value of m/z) 239 of the ion peak 201 ranging from 234 to 244 was displayed in an enlarged state in order to set the mass calibration 202 as shown in FIG. 9(*a*), application of the unnecessary ion ejecting period 104 in accordance with the scan function shown in FIG. 5 caused either a part of or all the ions (unnecessary ions) with the value of m/z being lower than 234 and exceeding 244 to be ejected.

FIG. 9(*b*) shows a mass spectrum which can be attained by scanning an entire wide region of the value of m/z after the unnecessary ion ejecting period 104. As shown in the figure, ion peak having a high acute ion intensity was generated at a position with a m/z=239.1 and it was confirmed that the unnecessary ions other than ions with m/z=239.1 required for calibration were ejected.

That is, in the scan function for use in mass calibration shown in FIG. 5, since the unnecessary ions were sufficiently ejected in a period (unnecessary ion ejecting period) 104 before the scan period 102, no influence was applied under the spatial charge and a mass calibration could be carried out in a superior accuracy.

Figure 10:
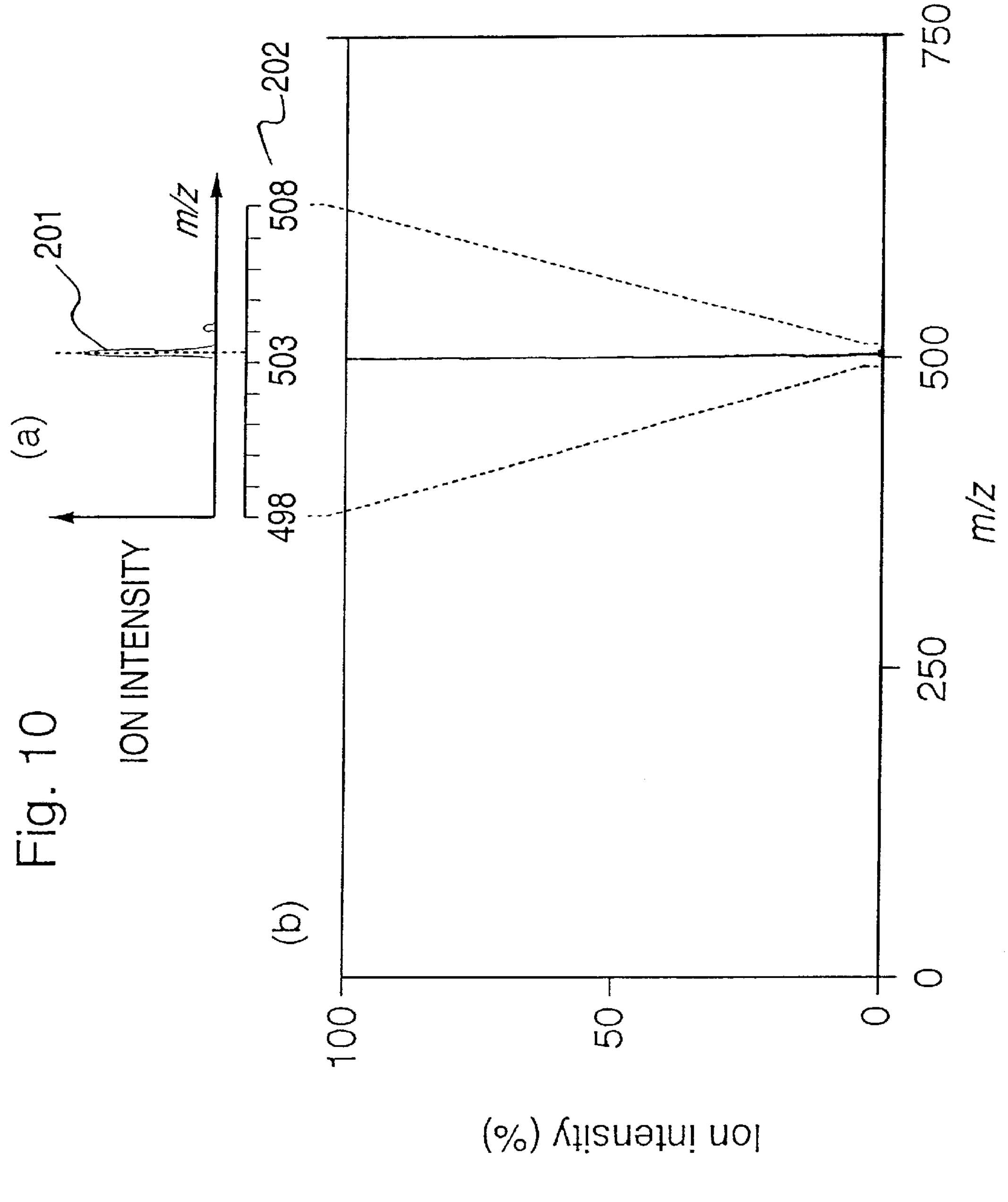
FIG. 10 is a view for illustrating a third preferred embodiment of the present invention.

Subsequently, in the case that a calibration is performed for another value of m/z, when a mass calibration is carried out under an application of $(HO—(CH_2—CH_2—O)_{11}—H)H^+$ with m/z=503.3, for example, it is satisfactory that a desired period near the ion peak is displayed in an enlarged state in the same manner as that of the aforesaid m/z=239.1 as shown in FIG. 10 and then a setting of condition for unnecessary ion ejection may be changed in such a way that the ions other than this ion may be ejected. Repetition of such an operation enabled the mass calibration to be carried out under an application of optional mass spectrum attained with polyethylene glycol being applied as a standard sample. Since polyethylene glycol provided a plurality of ion peaks having the values of m/z spaced apart by about 44, it was possible to perform a mass calibration for a wide region in a convenient manner without preparing many kinds of samples.

Embodiment 4

In the aforesaid preferred embodiment 3, the ion peaks appeared at the enlarged display section were left and other ion species were ejected in the case that the mass calibration was performed. However, in the preferred embodiment 3, when a plurality of kinds of ions applied for mass calibration in many kinds of ion species based on polyethylene glycol are apparent in advance, it is satisfactory that a frequency of FNF voltage applied in the unnecessary ion ejecting period 104 of the scan function is set in such a way that these plural kinds of ions (for example, ion peaks a, b and c) are concurrently left in the ion trap type mass analysis region.

Figure 11:
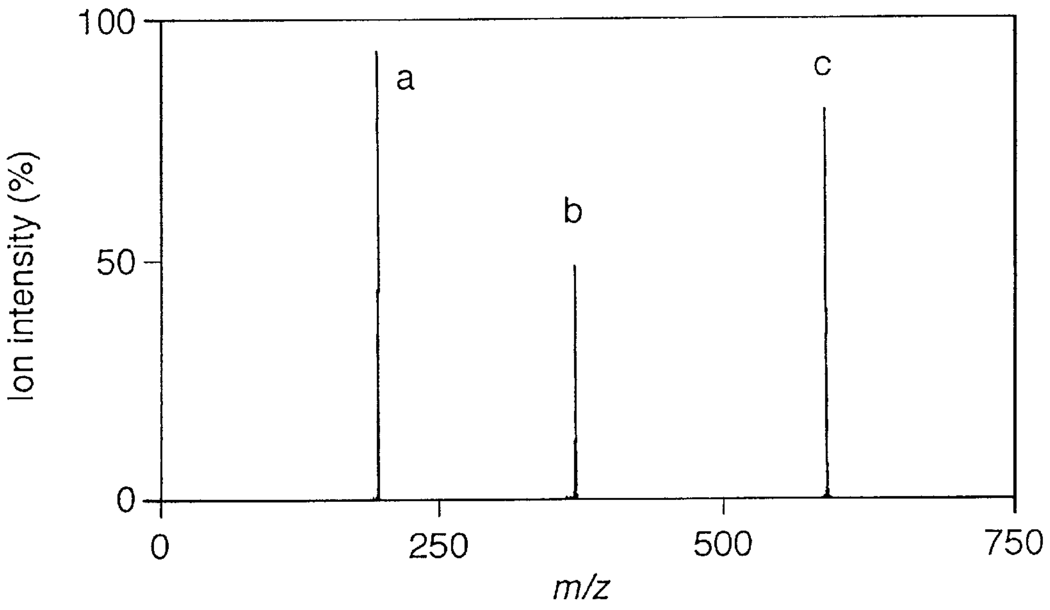
FIG. 11 is a view for illustrating a fourth preferred embodiment of the present invention.
Figure 12:
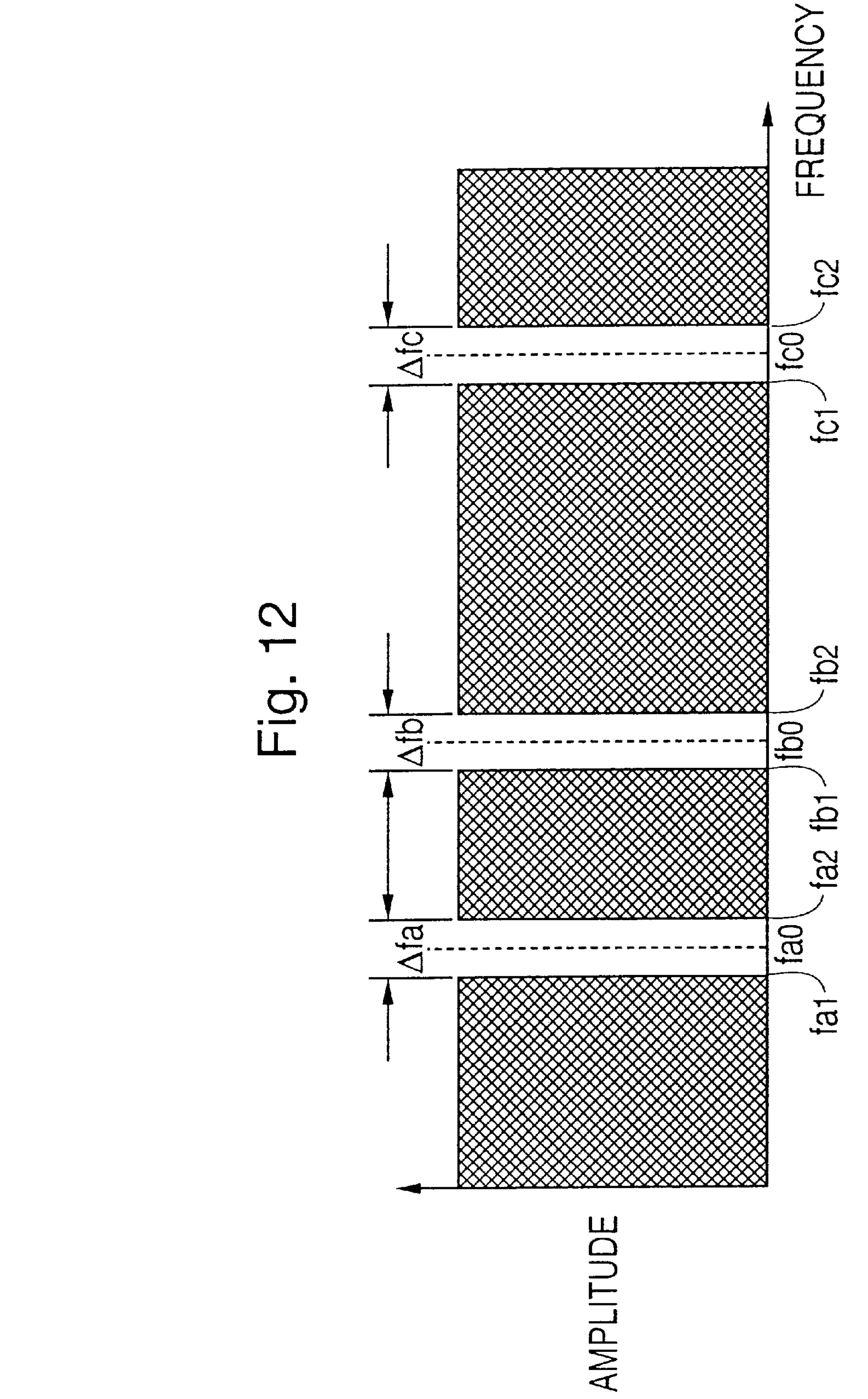
FIG. 12 is a view for illustrating a fourth preferred embodiment of the present invention.

FIG. 12 shows a frequency component of the FNF voltage used in the case that three ion species a, b and c shown in FIG. 11 are left in the ion trap type mass analysis region. In the case that each of specific frequencies required for accumulating the ion species a, b and c is defined as $fa_0$, $fb_0$ and $fc_0$, respectively, and it is satisfactory that a high frequency voltage not including each of the frequency components in a range of width Δfa of frequencies $fa_1$ to $fa_2$ as for the ion species a, in a range of widthΔfb of frequencies $fb_1$ to $fb_2$ as for the ion species b, and in a range of width Δfc of frequencies $fc_1$ to $fc_2$ as for the ion species c is applied as the FNF voltage between the endcap electrodes 19*a,* 19*b*. As described above, if a plurality of ion species used when the mass calibration is carried out are determined in advance and the FNF voltage is set in response to it, a convenient and high accurate mass calibration can be carried out even if the setting condition of the FNF voltage is not changed in response to the changing of the range of value of m/z to be displayed in enlarged state. In addition, although the present preferred embodiment above has indicated the case in which polyethylene glycol is used as a standard sample for use in generating a plurality of ion species required for performing a mass calibration over a wide range of m/z value, it is also apparent the processing can be carried out in the same manner as above also in the case that the standard sample other than polyethylene glycol is used.

As apparent from the description of the above preferred embodiments, in accordance with the present invention, since the mass calibration is carried out after the unnecessary ions not contributing to the mass calibration are ejected in advance, it becomes possible to perform a high accurate, convenient and easy mass calibration.

What is claimed is:

1. A method for mass calibration of a mass spectrometer having an ion trap type mass analysis region by using an observed ion peak position of a mass spectrum attained by mass scanning of ions of substance having a known value of m/z, where m is a molecular weight and z is a charge number, comprising the steps of:

generating ions having a plurality of known values of m/z in a predetermined range of m/z;

trapping the ions into the ion trap type mass analysis region; and reducing an amount of the ions trapped into the ion trap type mass analysis region prior to the mass scanning of the ions.

2. A method for mass calibration according to claim 1, wherein the step of reducing the amount of the ions trapped into the ion trap type mass analysis region is carried by ejecting the ions trapped into the ion trap type mass analysis region from the ion trap type mass analysis region.

3. A method for mass calibration according to claim 2, wherein the ejecting of the ions trapped into the ion trap type mass analysis region from the ion trap type mass analysis region is carried by applying a noise voltage between a pair of endcap electrodes arranged in opposition to the ion trap type mass analysis region, the noise voltage not including a frequency component in a specific range of frequency and including a frequency component in another specific range of frequency which is different from the specific range of frequency.

4. A method for mass calibration according to claim 1, 2 or 3, wherein the step of reducing the amount of the ions trapped into the ion trap type mass analysis region is carried out after the ions are trapped into the ion trap type mass analysis region.

5. A method for mass calibration according to claim 1, 2, or 3, wherein the step of reducing the amount of the ions trapped into the ion trap type mass analysis region is carried out in a period which is concurrent with a period of the trapping of the ions into the ion trap type mass analysis region.

6. A method for mass calibration of a mass spectrometer having an ion trap type mass analysis region by using an observed ion peak position of a mass spectrum attained by mass scanning of ions of substance having a known value of m/z, where m is a molecular weight and z is a charge number, comprising the steps of:

displaying in an enlarged state a mass spectrum in a predetermined range of the value of m/z including a desired ion peak position in the mass spectrum of the ions of the substance having the known value of m/z; and ejecting ions having a value of m/z which is outside of the predetermined range from the ion trap type mass analysis region as unnecessary ions.

7. A method for mass calibration according to claim 6, wherein the step of ejecting of the unnecessary ions from the ion trap type mass analysis region is carried out by applying a noise voltage between a pair of endcap electrodes arranged in opposition to the ion trap type mass analysis region, the noise voltage not including a frequency component in a specific range of frequency and including a frequency component in another specific range of frequency which is different from the specific range of frequency.

8. A method for mass calibration according to claim 6 or 7, wherein the ejecting of the unnecessary ions from the ion trap type mass analysis region is carried out after the ions are accumulated in the ion trap type mass analysis region.

9. A method for mass calibration according to claim 6 or 7, wherein the step of ejecting of the unnecessary ions from the ion trap type mass analysis region is carried out in a period which is concurrent with a period of accumulating of the ions in the ion trap type mass analysis region.

* * * * *